United States Patent
Anderson et al.

(10) Patent No.: US 8,917,171 B2
(45) Date of Patent: Dec. 23, 2014

(54) VEHICLE WARNING LIGHT SYSTEM AND METHOD

(76) Inventors: J. Thomas Anderson, Hammond, LA (US); Christopher Broadwater, Hammond, LA (US)

( * ) Notice: Subject to any disclaimer, the term of this patent is extended or adjusted under 35 U.S.C. 154(b) by 131 days.

(21) Appl. No.: 13/606,655

(22) Filed: Sep. 7, 2012

(65) Prior Publication Data

US 2014/0070937 A1   Mar. 13, 2014

(51) Int. Cl.
*B60Q 1/50*   (2006.01)

(52) U.S. Cl.
USPC ............................................. 340/467

(58) Field of Classification Search
USPC .......... 702/141, 152; 340/438, 464, 467, 479
See application file for complete search history.

(56) References Cited

U.S. PATENT DOCUMENTS

| | | | |
|---|---|---|---|
| 3,320,586 A * | 5/1967 | Wagner | 340/464 |
| 5,016,996 A * | 5/1991 | Ueno | 359/838 |
| 5,463,370 A | 10/1995 | Ishikawa et al. | |
| 5,594,415 A | 1/1997 | Ishikawa et al. | |
| 5,606,310 A | 2/1997 | Egger et al. | |
| 5,663,707 A | 9/1997 | Bartilucci | |
| 5,682,137 A | 10/1997 | Li | |
| 5,770,999 A | 6/1998 | Rhodes | |
| 5,963,172 A * | 10/1999 | Pfizenmaier et al. | 343/721 |
| 7,075,423 B2 | 7/2006 | Currie | |
| 7,352,278 B2 * | 4/2008 | Terzian | 340/471 |
| 7,397,355 B2 | 7/2008 | Tracy | |
| 7,541,918 B1 * | 6/2009 | Rizzi | 340/438 |
| 7,589,622 B2 | 9/2009 | Farley | |
| 2002/0183954 A1 * | 12/2002 | Taniguchi et al. | 702/117 |
| 2004/0124697 A1 * | 7/2004 | MacGregor et al. | 303/89 |
| 2005/0073401 A1 | 4/2005 | Currie | |
| 2006/0103517 A1 | 5/2006 | Martin | |
| 2006/0125615 A1 | 6/2006 | Song | |
| 2006/0125616 A1 | 6/2006 | Song | |
| 2007/0040664 A1 * | 2/2007 | Johnson et al. | 340/467 |
| 2008/0062706 A1 | 3/2008 | Feldmeier | |
| 2009/0201650 A1 * | 8/2009 | Hauser et al. | 361/736 |
| 2011/0014863 A1 * | 1/2011 | Foster | 455/1 |
| 2011/0084807 A1 * | 4/2011 | Logan et al. | 340/10.1 |
| 2011/0304455 A1 * | 12/2011 | Kisiel | 340/479 |
| 2012/0075857 A1 * | 3/2012 | Verbrugh | 362/249.01 |

FOREIGN PATENT DOCUMENTS

GB   2377562 A   *   1/2003

OTHER PUBLICATIONS

2g/4g/8g Three Axis Low-g Digital Output Accelerometer, Docment No. MMA7455L Freescale Semiconductor, Technical Data Rev 10, Dec. 2009.*

* cited by examiner

*Primary Examiner* — Hai Phan
*Assistant Examiner* — Royit Yu
(74) *Attorney, Agent, or Firm* — Todd L. Juneau

(57) ABSTRACT

This invention relates to an externally mounted vehicle warning light system and related method, employing an accelerometer illuminating different lights to indicate to other drivers whether a vehicle is accelerating, decelerating, coasting or braking.

1 Claim, 2 Drawing Sheets

VEHICLE WARNING LIGHT SYSTEM AND METHOD

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

This invention relates to warning light systems for vehicles and a related method, including but not limited to automobiles, trucks, trailers, motorcycles or watercraft, wherein the light system is intended to warn nearby persons about the motion status of the vehicle.

2. Background of the Invention

The present invention is intended to address issues of driver safety related to changes, especially changes with little warning, in the speed of an automobile in relation to surrounding traffic. In particular, for so long as there have been multiple autos on public roadways, problems have arisen when a vehicle quickly changes its speed without warning. Nearly all vehicles in use today still employ the classic brake light system, which provides following drivers a view of red lights upon a driver's application of the brake pedal. Classic brake lights only communicate a portion of the relevant and available information to surrounding drivers by warning drivers behind the vehicle when the driver decelerates by applying his or her brakes. Such a system is incomplete, as it presents only a single piece of information, and only to drivers behind the vehicle.

The current state of knowledge is as follows. Various front and rear mounted vehicle warning lights are known. O'Sullivan, U.S. Pat. No. 5,373,426 is a front mounted vehicle brake light for alerting pedestrians or other vehicle drives positioned in front of a vehicle that it is de-accelerating. Rudd, U.S. Pat. No. 3,908,144 discloses a sealed beam headlight with an additional brake light connected to the brake pedal of an automobile to not only provide forward illumination, but also signals operation of the braking system of the vehicle to those who can see the front of the vehicle. Both are difficult to be seen from the side, and do not indicate if the vehicle is accelerating. Dankert, U.S. Pat. No. 3,364,384, discloses a speed controlled signal system with a plurality of panels mounted to the front, back and side of a vehicle via a complex circuit to indicate whether a vehicle is accelerating or de-accelerating. Voano et al, U.S. Pat. No. 5,258,740 discloses front mounted cornering lamps selectively indicating brake and acceleration of a vehicle, which is visible from the front of a vehicle and one side. Gianfocaro, U.S. Pat. No. 4,837,554 discloses another speed controlled signal system with a plurality of panels mounted to the front, back and side of a vehicle via a complex circuit employing a motion switch using red and green lights to indicate whether a vehicle is accelerating or de-accelerating. Walton, U.S. Pat. No. 5,966,073 discloses front side and/or front mounted brake and running turn signal lights. Kao, U.S. Pat. No. 5,798,691 discloses an accessory LED brake light system secured to the front most central position of the automobile to provide warning signals when the automobile is braking to those positioned in front of the vehicle. Pitcher, U.S. Pat. No. 5,680,101 discloses a dash mounted forward facing brake light mounted within the passenger compartment. Jandron, U.S. Pat. No. 5,758,944 discloses vehicle wrap around side/front brake lights. Tracy, U.S. Pat. No. 7,397,355 discloses a reversible front or rear mounted light system employing an accelerometer circuit to control the initiation of warning lights to indicate if a vehicle is accelerating or de-accelerating or losing traction in turns.

BRIEF SUMMARY OF THE INVENTION

The novel component of this work is the provision of more specific information regarding a vehicle's rate of motion to drivers surrounding the vehicle.

The invention described here demonstrates a light warning system for mounting on a vehicle which provides surrounding motorists with information not only about active braking by the driver, but of a range of possible motions by such vehicle, including but not limited to: acceleration, deceleration and coasting.

In a preferred embodiment, the invention is a vehicle-mounted motion warning light system for comprising: a power source, a fuse, an accelerometer, an accelerometer interface, a wiring harness, a plurality of light sockets, a plurality of lighting elements, a plurality of base components for attaching said lighting elements to the outer surface of a vehicle, one or more lens covers to cover said lighting elements.

In another preferred embodiment, the invention further comprises a brake switch between the power source and wiring harness, which brake switch, upon activation, overrides the signal from the accelerometer interface.

In another preferred embodiment, the invention further comprises an accelerometer with digital outputs, no fewer than two axes and a frequency of 100 Hz or more.

In another preferred embodiment, the invention further comprises an accelerometer with a frequency of 200 Hz or more.

In another preferred embodiment, the invention further comprises an accelerometer that is a piezoelectric accelerometer.

In another preferred embodiment of the invention, the site of attachment of the lighting elements is one or more of the upper portion of a vehicle's rear windshield, the rear bumper area, one or both rear view mirrors, the front grill area and the front bumper area.

In another preferred embodiment of the invention, the lights indicating various stages of motion are varied in color.

In another preferred embodiment of the invention, the light indicating acceleration is green, the light indicating coasting is yellow, the light indicating deceleration is pink and the light indicating braking is red.

In another preferred embodiment of the invention, the light bulb comprised within each lighting element is a halogen bulb of either the high-pressure or low-pressure gas-discharge variety.

In another preferred embodiment of the invention, each the lighting element is comprised of one or more LED bulbs.

In another preferred embodiment of the invention, heavy acceleration or heavy deceleration cause the related lights to blink rather than burn constantly.

In another preferred embodiment of the invention, the shapes of each lighting element lens cover are different.

In another preferred embodiment of the invention, the shapes are: a downward-facing arrow for deceleration, a circle, square or rectangle for coasting, and an upward-facing arrow for acceleration.

In another preferred embodiment of the invention, the lighting elements combine to form a single continuum bar comprising a single lens cover or a plurality of interlocking lens covers indicating motion as follows: heavy deceleration illuminates the far left of the bar, lighter deceleration illuminates lighting elements to the left of center, coasting illuminates lighting elements in the center of the bar, light acceleration illuminates lighting elements to right of center, and heavy acceleration illuminates the far right of the bar.

In another preferred embodiment of the invention, the lens cover of the continuum bar is colored as follows: red on the left side with a lightening shade as it approaches the center, yellow in the center, and green on the right side with a lightening shade as it approaches the center.

In another preferred embodiment, a method of providing information regarding vehicular movement to surrounding persons by employing the vehicle warning light system detailed herein above.

DETAILED DESCRIPTION OF THE INVENTION

Definitions

Figure 1:
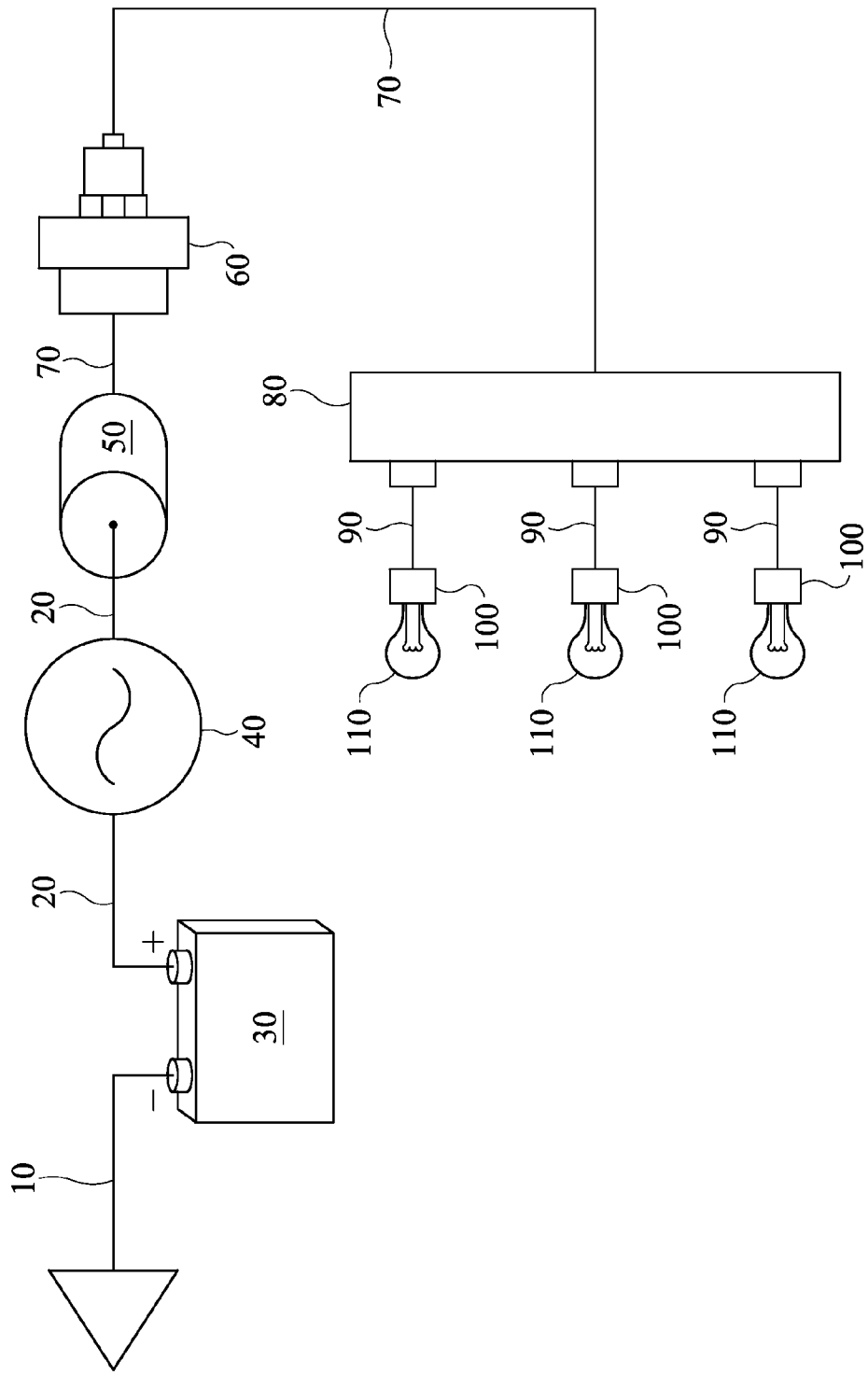
FIG. 1 is a schematic drawing of the components of the vehicle light warning system and the electrical wires connecting said components.

The following definitions are provided as an aid to understanding the detailed description of the present invention.

The phrase "LED" means light emitting diode.

The acronym "MEMS" means micro-electro-mechanical systems, or very small electrical devices that usually consist of a central unit that processes data (the microprocessor) and several components that interact with the outside such as microsensors.

The phrase "wiring harness" means an assembly of wires that transmit signals or electrical power.

The standard brake lighting system in use in modern vehicles has remained largely unchanged for decades. At one end, break light bulbs in sockets are connected to a wiring harness, which harness is connected to an electrical power wire. At the other end the wire connects to a power source, usually a car battery. The power wire connects the battery to the vehicle's fuse block, and continues on to the brake switch. The brake switch is held in place near the brake pedal, so that the pedal will make contact with the switch when the pedal is depressed. Contact between the brake pedal and the switch creates a completed circuit and sends a current along the wire to the brake lights, which illuminate.

Historically, brake lights have consisted of white incandescent light bulbs set behind red tinted glass or plastic. For decades there were two such lights, one mounted on each rear corner of the vehicle. Through the 1980's and 1990's, a third brake light, also red in color, was added to the upper portion of the rear windshield of most vehicles. During the same period, light bulb designs have expanded to include LED and halogen bulbs, which tend to have longer useful lives and require replacement less frequently.

The problems related to vehicle braking warning systems is how to mitigate driver inattention and delayed reaction by providing as much useful information to surrounding drivers as possible, as quickly as possible. Vehicle braking warning systems currently in use on the road leave substantial room for improvement on each such point.

Regarding the amount of information communicated, the current system can be improved in two ways. First, the current system provides warning of braking only, as opposed to a range of information including, by way of example and not limitation, acceleration, deceleration, and/or coasting. Second, the current system provides information only to one or more following vehicles and not to vehicles in front of or adjacent to the vehicle in question.

Regarding speed of delivery of such information, current brake lights provide information regarding the application of brakes almost instantaneously, but fails to provide any warning of potential or impending braking. In contrast, a system providing evidence of deceleration would serve to warn surrounding drivers of the potential for braking in the near future.

Current braking systems to convey limited information in a format that is easily understood, largely due to their many years in service and the fact that new drivers all train using such systems. It is possible, however, for a new and expanded warning light system to provide a greater range of information without sacrificing this efficiency of form. Through the prevalent use of uniform stoplights, it is widely understood among drivers that red is the color representing "stop", green is the color representing "go", and yellow is a color representing "caution", or an intermediate position. Drivers today understand these color codes in a way that elicits immediate reactions from drivers and thereby maximizes safety. This common understanding of color coding can therefore be used to convey the motion status of a vehicle without requiring today's drivers to learn anything new, and without sacrificing reaction time.

Accordingly, a principal object of the instant technology is to increase driver safety by increasing the amount of information conveyed by a vehicle warning light system, without confusing surrounding drivers or otherwise inhibiting reaction time.

A central component of the instant technology will be the use of an accelerometer. Accelerometer devices are used in many types of machines, including automobiles, in which they are commonly utilized in drive train and braking performance evaluation systems, alarm systems and crash detection and airbag deployment systems. As such, the devices are well known in the art. Accelerometer technology has become increasingly advanced, miniaturized and inexpensive in recent years, in part due to the invention of MEMS, micro-electro-mechanical systems, which provides for the use of silicon chip-based devices.

In order to accurately measure acceleration, an accelerometer must first measure the degree of incline or decline in the surface over which the vehicle is traveling. To obtain such a tilt measurement, an accelerometer employs a sensitivity axis determining a line parallel to the ground surface and measuring the degree of tilt, forward or backward, of the vehicle at a given moment in time, utilizing the following formula:

Tilt Angle=ArcSin(measured acceleration/1 g)

In this formula, 1 g=one gravitational force. An accelerator stationary on the ground will measure a value of 1 g, whereas an accelerator in free fall towards the center of the Earth will measure a value of zero because it is at rest in a frame of reference in which objects are weightless. Since side-to-side tilt is also relevant to an acceleration measurement, all accelerometers have at least two axes for this purpose.

Accurately measuring extreme acceleration and deceleration in an automobile, including abrupt starts and stops, will likely require a frequency of 100 Hz or more. This specification provides the accelerometer with the ability to take multiple measurements per second to ensure fast and accurate reporting to the lighting system. Optimum speeds may require a frequency of 200 Hz or more.

An accelerometer can be either digital or analog, although digital outputs for an automobile accelerometer will almost certainly be required to allow for interface with the auto's computer system. A common basis for the functioning of an accelerometer is the piezoelectric effect, in which the device contains crystalline structures which generate a voltage in response to acceleration. Another basis for accelerometer function is the recognition of acceleration based on a change in capacitance between microstructures within the device, which is recognized by circuitry within the device.

One type of accelerometer known in the art is the strain gauge accelerometer, which often uses metallic foil. In such devices the force of acceleration or deceleration applies strain to a gauge network, which generates voltage that can be read from output leads.

In contrast, the piezoelectric accelerometer operates using the piezoelectric effect to measure dynamic changes in mechanical variables, such as acceleration. In such a device, when physical force is exerted, the seismic mass loads the piezoelectric element according to Newton's second law of motion: F=ma The force exerted on the piezoelectric material can be observed in the change in the electrostatic force or voltage generated by the piezoelectric material. Active materials used in piezoelectric devices can be either single crystal (e.g., quartz) or ceramics. Examples of piezoelectric ceramics include barium titanate, lead-zirconate-lead-titanate, lead metaniobate and other materials. Ceramics have a higher sensitivity, but their piezoelectric properties degrade over time. Piezoelectric accelerometers allow for a high frequency response in comparison to other known types of accelerometers, and makes them particularly well-suited for use on high speed vehicles.

As the voltage output on the accelerometer will vary according to the acceleration or deceleration of the vehicle, an interface module containing a semiconductor and software algorithm will be able to read such voltage output and communicate a range of information to the warning light system and, optionally, to the automobile's master computer. Such interface may be built into the body of the accelerometer, or may be a free-standing component.

In a preferred embodiment, the algorithm contained in the interface will correlate the accelerometer's voltage output with a specific level of acceleration or deceleration, and pass current along an appropriate output wire for illuminating lights indicating that type of motion. The ability to read a voltage continuum could also allow for a varying intensity of light element brightness, either through a dimmer feature or through the lighting of a progressively greater number of light bulbs.

In another preferred embodiment, the interface could read the voltage continuum and translate such information into a signal readable at a second interface module, which could then use the information to light a portion of a continuum bar of signal lights. In such a configuration, for example, a high level of acceleration could be translated so that the far right side of a continuum bar is illuminated, while lesser acceleration illuminates a portion further to the left, giving way to deceleration illuminating a portion even further to the left, and active braking illuminating the farthest left quadrant. In a more preferred embodiment, color coding across the bar lens (es) could be employed to further indicate the type of motion being signaled.

In another preferred embodiment, the interface would provide its information to the automobile's master computer. Upon such communication, the acceleration readings could be stored in the master computer's memory and accessed and compared at intervals against current data to increase the accuracy of readings over time. For automobiles with a global positioning system feature, data from the accelerometer interface could also be combined with or compared against real time GPS data for increased efficiency or accuracy of readings.

In another preferred embodiment, data shared with the automobile's central computer could be shared through wireless transmission with surrounding automobiles. Such data transmission could be used in "smart car" software technologies such that, for example, a following car could automatically brake or turn in response to a rapid stop by a preceding vehicle.

Referring now to the figures, FIG. 1, a schematic drawing, illustrates a standard vehicle warning light system wherein each of ground wire 10 and power wire 20 are attached to battery 30, with power wire 20 engaging fuse 40 and continuing to accelerometer/interface module 50 and then via a plurality of output wires to brake switch 60, which then connects via output wires 70 to wiring harness 80, which connects to each light wire 90, which then connects to each light bulb socket 100, which transmits the current to a illuminate light bulb 110.

Figure 2:
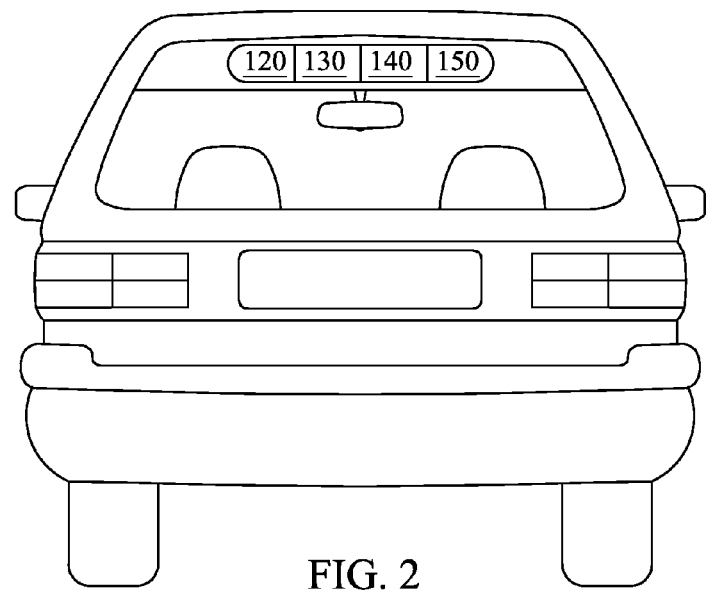
FIG. 2 is a line drawing evidencing a possible arrangement pattern of the lighting elements of the vehicle light warning system, and evidencing said components' placement at the top of a vehicle's rear windshield.

Referring now to FIG. 2, a line drawing, which illustrates a brake light assembly mounted to the upper edge of a vehicle's rear windshield, wherein a light bulb 110 (not pictured) rests beneath each of a green lens 12, yellow lens 130, pink lens 140 and red lens 150.

Figure 3:
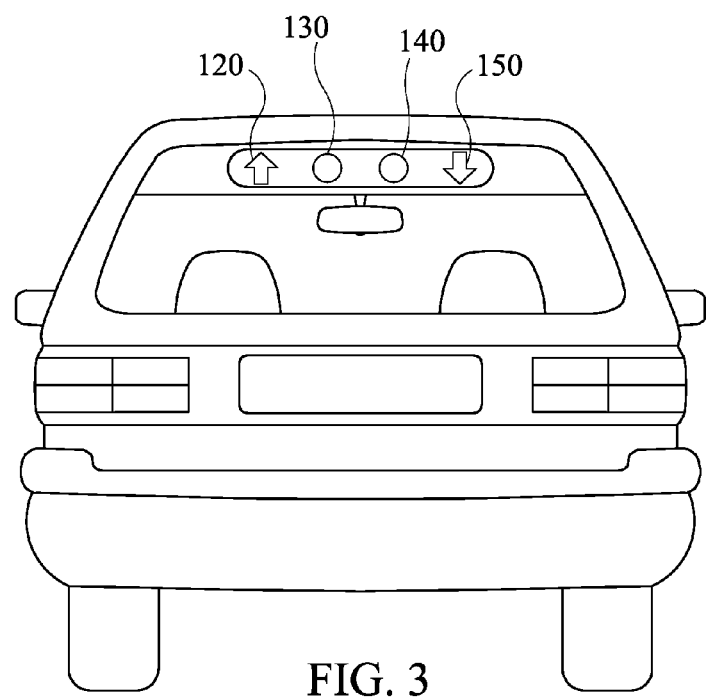
FIG. 3 is a line drawing evidencing a possible arrangement pattern of the lighting elements of the vehicle light warning system, including a possible pattern of shapes indicating various states of motion of the vehicle.

Referred now to FIG. 3, a line drawing, which illustrates a brake light assembly mounted to the upper edge of a vehicle's rear windshield, wherein a light bulb 110 (not pictured) rests beneath each of green lens 120, yellow lens 130, pink lens 140 and red lens 150, which lenses are shaped as an upward-facing arrow, a circle, a circle and a downward-facing arrow, respectively.

In another preferred embodiment, the light bulbs used in the warning light system are standard incandescent bulbs. In a more preferred embodiment, high-pressure or low-pressure gas discharge system halogen bulbs are used. Halogen bulbs are brighter than incandescent lights, use less power, last much longer, and also illuminate to full intensity in less than one millisecond, whereas incandescent lights take approximately 200 milliseconds to switch on after application of the electrical charge.

In another preferred embodiment, LED light bulbs are used in the lighting elements. LED lights are more durable and longer-lasting than incandescents, and allow for a greater freedom of configuration than do incandescent bulbs.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A vehicle-mounted motion warning light system comprising: a power source, a fuse, an accelerometer, an accelerometer interface, a wiring harness, a plurality of light sockets, a plurality of lighting elements, a plurality of base components for attaching said lighting elements to the outer surface of a vehicle, one or more lens covers to cover said lighting elements;

further comprising wherein the lighting elements combine to form a single continuum bar comprising a single lens cover or a plurality of interlocking lens covers indicating motion as follows: heavy deceleration illuminates the far left of the bar, lighter deceleration illuminates lighting elements to the left of center, coasting illuminates lighting elements in the center of the bar, light acceleration illuminates lighting elements to right of center, and heavy acceleration illuminates the far right of the bar; and wherein the lens cover(s) of the continuum bar is colored as follows:

red on the left side with an incrementally lightening shade toward the center, yellow in the center, and green on the right side with an incrementally lightening shade toward the center.

\* \* \* \* \*